(12) United States Patent
Moore

(10) Patent No.: US 6,214,059 B1
(45) Date of Patent: *Apr. 10, 2001

(54) LIQUID ALKALI FOR REACTIVE DYEING OF TEXTILES

(75) Inventor: Samuel B. Moore, Burlington, NC (US)

(73) Assignee: Burlington Chemical Co., Inc., Burlington, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/800,832

(22) Filed: Feb. 14, 1997

Related U.S. Application Data

(60) Division of application No. 08/466,353, filed on Jun. 6, 1995, now Pat. No. 5,603,736, which is a continuation-in-part of application No. 08/327,041, filed on Oct. 21, 1994, now abandoned, which is a division of application No. 07/874,754, filed on Apr. 27, 1992, now Pat. No. 5,382,262.

(51) Int. Cl.$^7$ .................................................. C09B 67/10
(52) U.S. Cl. ..................... 8/543; 8/618; 8/918; 423/421; 423/641
(58) Field of Search .............................. 8/543, 618, 918; 252/193; 423/421, 580.1, 641, 646; 510/434, 435, 478, 509

(56) References Cited

U.S. PATENT DOCUMENTS

| | | | |
|---|---|---|---|
| 1,562,891 | * 11/1925 | Klopstock et al. | 423/421 |
| 3,718,641 | * 2/1973 | Muller et al. | 8/549 |
| 3,773,902 | * 11/1973 | Neumann | 68/18 F |
| 3,975,503 | * 8/1976 | Hauschild et al. | 423/421 |
| 4,153,413 | * 5/1979 | Bostock et al. | 8/543 |
| 4,169,705 | * 10/1979 | Boyd et al. | 8/549 |
| 4,278,433 | * 7/1981 | Blum et al. | 8/549 |
| 4,521,332 | * 6/1985 | Milora | 510/272 |
| 4,555,348 | * 11/1985 | Moran | 252/1 |
| 4,737,308 | * 4/1988 | Pearson | 510/474 |
| 4,769,170 | * 9/1988 | Omori et al. | 510/170 |
| 4,836,948 | * 6/1989 | Corring | 510/370 |
| 4,869,844 | * 9/1989 | Johnson | 510/268 |
| 5,141,664 | * 8/1992 | Corring et al. | 510/370 |
| 5,209,863 | * 5/1993 | Dixit et al. | 510/223 |
| 5,667,532 | * 9/1997 | Moore | 8/543 |

FOREIGN PATENT DOCUMENTS

283114 * 9/1988 (EP).
2305482 * 11/1976 (FR).

OTHER PUBLICATIONS

Grant & Hackh's Chemical Dictionary, Fifth Edition, McGraw–Hill Book Co., p. 541, 1987.*
Grant & Hackh's Chemical Dictionary, Fifth Edition, McGraw–Hill Book Company, p. 564, 1987.*

* cited by examiner

Primary Examiner—Caroline D. Liott
(74) Attorney, Agent, or Firm—Rhodes & Mason, PL

(57) ABSTRACT

A liquid alkali composition for use in fiber reactive dyeing of cotton and cotton blended fabrics or the like. The liquid alkali is a solution of sodium hydroxide, potassium hydroxide, and potassium carbonate formed by reaction of $CO_2$ with the potassium hydroxide solution, and adding sodium hydroxide to the resultant mixture. The resulting supersaturated solution has a high enough Total Alkalinity to achieve reaction between the dye, including vinyl sulfone dyes, and fiber but is sufficiently buffered to achieve this reaction slowly so that the fiber reactive dyes fix in a level, uniform fashion. Preferably the composition includes potassium carbonate, potassium citrate, and potassium polyacrylate. The citrate and polyacrylate act as dispersants in the dyeing process and also act as crystallization inhibitors in solution. The use of the carbonate compounds of the present invention in place of conventional silicates or phosphorus prevents the discharge of untreatable toxic wastewater into natural waterways.

4 Claims, No Drawings

LIQUID ALKALI FOR REACTIVE DYEING OF TEXTILES

This is a division of application No. 08/466,353, filed Jun. 6, 1995, now U.S. Pat. No. 5,603,736 issued Oct. 9, 1998, which is a continuation-in-part of application No. 08/327,041, filed Oct. 21, 1994, now abandoned, which is a division of application No. 07/874,754, filed Apr. 27, 1992, now U.S. Pat. No. 5,382,262.

BACKGROUND OF THE INVENTION (1) Field of the Invention

The present invention relates generally to buffered alkalis for use in the dyeing of textiles, as well as for use in paper processing, waste treatment and laundry and dishwashing uses and, more particularly, to a liquid alkali for use in fiber reactive dyeing of cotton and cotton blended fabrics.

(2) Description of the Prior Art

Fiber reactive dyes were first introduced in 1956. Since that time they have become a dominant factor in dyeing cotton, regenerated cellulose and blends. These dyes can also be used to dye acrylics, nylon, silk, and wool and blends of these fibers. Fiber reactive dyes are easy to apply and produce brilliant shades, fastness, penetration and leveling.

Fiber reactive dyes are anionic in nature and react chemically with the fiber. The dyes include a chromophore to give color to the dye and a reactive group to form a chemical bond with the fiber. There may also be a substituent or solubilizing group which provides additional dyeing characteristics such as solubility, substantivity, migration, washing off, etc. Fiber reactive dyes react in the presence of alkali to form a strong covalent chemical bond between a carbon atom of the dye molecule and an oxygen atom of the hydroxyl group in the cellulose. This step is called "fixing".

The following alkalis have all been used to obtain the "fix" of different classes of reactive dyes to cellulose fibers:

| | |
|---|---|
| Sodium Hydroxide | Potassium Hydroxide |
| Trisodium Phosphate | Sodium Tripolyphosphate |
| Sodium Carbonate | Sodium Bicarbonate |
| Sodium Silicate | |

However, no single alkali system has worked on all classes of reactive dyes due to the differences in the rate of hydrolysis of each dye. Of all the alkali systems, the liquid phosphate system described in U.S. Pat. No. 4,555,348, issued to Moran, and sold under the tradename Alkaflo by Sybron Chemicals of Birmingham, N.J., works almost universally. But Alkaflo is high in phosphorus which can contribute to environmental problems.

Another commercial liquid alkali is sold under the tradename Burco NP-Q Salt and is available from Burlington Chemical Co., Burlington, N.C. This product is based on a mixture of sodium hydroxide, potassium hydroxide, soda ash, citrate, acrylate salt. The resulting neutralization/buffer curve is similar to the phosphorus-based Alkaflo. The problem with both NP-Q Salt and Alkaflo is that hydrolysis is still too quick when using Trichlor Pyrimidine, Difluorchlor Pyrimidine or Dichlorchinoxaline dyes (sold under the tradename "Levafix" and available from ICI America, Wilmington, Del.). While these alkalis are suitable for sulfatoethysulfone or chlortriazine dyes, they are too "hot" for the Levafix-type colorants.

Another alkali which has been used on and off, as discussed above, is sodium carbonate. In difficult dyeing situations, i.e., matching shades with reactive dyes of differing reactivities, sodium carbonate demonstrates the best overall dyeing performance because of high Total Alkalinity and good buffering. The problem with sodium carbonate is that it takes 20% on weight of bath (OWB) to fix the dye. Unfortunately, the maximum g/L total solubility of sodium carbonate (approximately 25%) limits the concentration of the liquid alkali that can be produced. In addition, using the alkali as a powder is not feasible in modern dyeing equipment.

The problem with using a solution of sodium carbonate is further complicated due to changes in dyeing that occur when adding large amounts of liquid to dyebaths, i.e. changes in liquor ratio or fabric to water ratio. In essence, when large volumes of liquid are added to reactive dyebaths, a dilution occurs which changes the concentration of the dye in contact with the fiber. Therefore, it is advantageous to add as low a volume of alkali as possible.

Assuming a sufficiently concentrated solution could be prepared, the best product would be a liquid alkali with a high enough Total Alkalinity to achieve the reaction between the dye and fiber but sufficiently buffered to achieve this reaction slowly so that the dye fixes in a level uniform fashion. The difference between the Active and Total Alkalinities is especially important, the greater the differential, the better the ultimate performance.

However, if the reaction mixture is too "hot" or alkaline, such as is seen with pure sodium hydroxide, the sensitive-type reactive dyes will hydrolyze with the water in the dyebath and form a nonreactive pigment that has no effect on the fabric color. Furthermore, as fashions have changed, the need to mix reactive dyes of different chemistries in the same shade and the necessity of developing a universal alkali system for cold pad batch dyeing that does not contain silicates or phosphorus has become more important.

On the other hand, the reaction mixture must be have sufficient active caustic alkalinity to meet the reaction requirements of the dyes being used, vinyl sulfone dyes, in particular, will require a hotter or more alkaline environment.

Thus, there remains a need for a liquid, phosphorus and silicate-free, alkali for use in fiber reactive dyeing of cotton and cotton blended fabrics which has a buffer curve similar to sodium carbonate but with the clean dyeing properties of a phosphorus-based system such as Alkaflo, and an active alkalinity sufficient to meet the dyeing requirements of the particular dye being used.

SUMMARY OF THE INVENTION

The present invention is directed to a liquid alkali useful for a variety of applications, especially for use in dyeing of cotton and cotton blended fabrics. The liquid alkali is a solution of an alkali metal hydroxide and its carbonate formed by reaction of liquid $CO_2$ with the alkali metal hydroxide solution. The resulting supersaturated solution has a high enough Total Alkalinity to achieve reaction between the dye and fiber but is sufficiently buffered to achieve this reaction slowly so that the fiber reactive dyes fix in a level, uniform fashion. Preferably the composition is a mixture of potassium hydroxide, potassium carbonate, sodium citrate, and polyacrylic acid. The citrate and polyacrylate act as dispersants in the dyeing process and also act as crystallization inhibitors in solution. The use of the carbonate compounds of the present invention in place of conventional silicates or phosphorus prevents the discharge of untreatable toxic wastewater into natural waterways.

The invention is also directed to buffered alkalis comprised of a mixture of sodium and potassium hydroxides, and sodium and potassium carbonates, which exhibit the desired buffering while also exhibiting the necessary active alkalinity to achieve dyeing with dyes such as vinyl sulfone dyes. The compositions may also include sodium citrate and polyacrylic acid.

Accordingly, one aspect of the present invention is to provide a liquid composition for use in reactive dyeing of cotton and cotton blended fabrics or the like. The composition includes an alkaline metal hydroxide, its carbonate and water and has a 2% pH value of greater than about 12 and a difference between the values of Total and Active Alkalinities of about 11.

Another aspect of the present invention is to provide a liquid composition for use in reactive dyeing of cotton and cotton blended fabrics or the like. The composition includes: (a) up to about 12 wt % of an alkali metal hydroxide; (b) about 22 to 50 wt % of an alkali metal carbonate; and (c) the balance water.

Another aspect of the present invention is to provide a liquid composition for use in reactive dyeing of cotton and cotton blended fabrics or the like. The composition includes: (a) up to about 12 wt % of an alkali metal hydroxide; (b) about 22 to 50 wt % of an alkali metal carbonate; (c) up to about 5 wt % of an alkali metal citrate; (d) up to about 10 wt % of an alkali metal polyacrylate; and (e) the balance water.

Still another aspect of the present invention is to provide a process for preparing a liquid composition for use in reactive dyeing of cotton and cotton blended fabrics or the like. The process includes the steps of: (a) introducing liquid caustic Potash into a reaction vessel; (b) adding caustic Potash flake to the mixture while mixing to adjust the amount of available alkali; (c) reacting the mixture with $CO_2$ while mixing; (d) stopping the $CO_2$ when the value of a 2% pH solution is about 12; and (e) cooling the mixture.

Yet another aspect of the present invention is to provide a liquid composition especially useful in the reactive dyeing of textiles comprised of (a) about 1 to about 50 wt % of sodium hydroxide; (b) up to about 10 wt % of potassium hydroxide; (c) about 1 to about 50 wt % of potassium carbonate; (d) up to about 5 wt % of an alkali metal citrate; (e) up to about 10 wt % of an alkali metal polyacrylate; and (f) the balance water.

Yet another aspect of the present invention is to provide a process for preparing a liquid composition useful in the reactive dyeing of textiles including the steps of: (a) reacting potassium hydroxide with $CO_2$ to form an aqueous mixture of potassium hydroxide and potassium carbonate, and (b) adding sodium hydroxide to the mixture.

These and other aspects of the present invention will become apparent to those skilled in the art after a reading of the following description of the preferred embodiment.

DESCRIPTION OF THE PREFERRED EMBODIMENTS

The Total and Active Alkalinities and 2% pH of the commercially available alkalis of sodium carbonate, Alkaflo, and Burco NP-Q solutions were measured, as shown in Table 1, in order to determine screening criteria for other candidate materials. The sodium carbonate saturated solution had good Total and Active Alkalinity values but the 2% pH value was low, thereby requiring too much solution be added to the dye bath. The Alkaflo values were good but, as discussed above, this material is high in undesirable phosphorus. Finally, Burco NP-Q did not have a large enough difference in its Total and Active Alkalinity values for good buffering.

Sodium carbonate and potassium carbonate were next added to Burco NP-Q to attempt to achieve the desired buffer effects. Potassium carbonate was found to be the best additive, but a maximum of 12% carbonate was all that could be post added without settling. As can be seen in Table 1, the 12% carbonate was not enough to properly effect the dyeing properties of the alkali since the 2% pH was only 11.3.

Various alternative approaches were considered to increase the level of carbonate in the liquid alkali, including adding stabilizing agents to prevent settling of the excess carbonate. However, these approaches were unsuccessful. Finally, the present invention is based on the idea of forming the carbonate component of the mixture "in situ" by using the alkalinity of either NaOH or KOH to form potassium carbonate and sodium carbonate by reaction with either gaseous or liquid carbon dioxide ($CO_2$). It was surprisingly discovered that this process permitted the formation of a supersaturated carbonate solution, thereby providing sufficient carbonate to be available for dyeing without settling problems.

In the preferred embodiment, the process for preparing the liquid alkali composition of the present invention includes the steps of: introducing liquid caustic Potash into a reaction vessel; adding caustic Potash flake to the mixture while mixing to adjust the amount of available alkali; reacting the mixture with $CO_2$ while mixing; stopping the $CO_2$ when the value of a 2% pH solution is about 12; and cooling the mixture. An apparatus suitable for carrying out this reaction is disclosed in U.S. Pat. No. 5,059,407, issued to Wallace et al., the entire disclosure of which is hereby incorporated by reference.

In an alternative embodiment, the process also included adding up to about 5 wt % citric acid and up to about 10 wt % polyacrylic acid to the liquid caustic Potash while mixing before the step of adding the caustic Potash flake to the mixture. The citrate and polyacrylate act as dispersants in the dyeing process and also act as crystallization inhibitors in solution. However, additional tests have shown that the mixture can be made without the citrate or the polyacrylate and still remain stable. Also, both processes preferably include filtering the mixture through a one micron or smaller filter.

When the alkali composition is to be used in dyeing textiles with reactive dyes such an vinyl sulfone dyes, an increase in the active alkalinity of the composition is required. In such instances the preferred compositions are prepared by the addition of sodium hydroxide, e.g., in the form liquid caustic (NAOH liq. 50%), to the aforesaid compositions in an amount sufficient to increase the active alkalinity of the composition to the desired level while maintaining the desired buffering.

More specifically, between about 1 to about 50 parts by weight of sodium hydroxide are added to between about 1 to about 50 parts by weight of the above buffered composition to increase the active alkalinity to the desired level, resulting in an aqueous composition comprised of about 1 to about 50 wt % of sodium hydroxide, up to about 10 wt % potassium hydroxide, and about 1 to about 50 wt % potassium carbonate. Other ingredients such as alkali metal citrates and alkali metal polyacrylates may also be present.

The resultant composition, depending upon the specific end use desired, will have a pH of at least about 10, and preferably between about 10.5 to about 12.5, an active alkalinity of between about 5 to about 38, and a total alkalinity of between about 10 to about 38. Normally, the ratio of total alkalinity to active alkalinity will be between about 1:1 to about 2:1.

EXAMPLES 1–5

Each of the candidate materials was tested for both Total and Active Alkalinity. Active Alkalinity is the amount of alkali titratable with strong acid to the phenolphthalein end-point. Total Alkalinity is the amount of alkali titratable with strong acid to the methyl orange end-point. The results of the initial screening of the candidate solutions is shown in Table 1, below:

TABLE 1

Total and Active Alkalinities of Selected Alkali

| Example | Alkali | Active Alk | Total Alk | 2% pH |
|---|---|---|---|---|
| 1 | Sodium Carbonate | 29 | 58 | 11.3 |
| 2 | Alkaflo | 12.5 | 16.7 | 12.3 |
| 3 | Burco NP-Q | 14.0 | 18.8 | 12.5 |
| 4 | NPQ plus Carbonate | 9.5 | 21.1 | 11.3 |
| 5 | Present Invention | 10.9 | 22.0 | 12.2 |

The above examples illustrate that only the present invention, having an excess of carbonate, has a 2% pH value of greater than about 12 and a difference between the values of Total and Active Alkalinities of about 11. The importance of these values will be shown more clearly understood by a review of the following dyeing tests.

It was determined that the ideal pH for all types of reactive dyeing was closest to sodium carbonate pH=10.5–11.0. Since this pH range is indicative of that achievable with sodium carbonate, dyeings were made at an equal shade depth using 20% sodium carbonate, 5, 10, 15, and 20% NPQ salt and 10 and 20% NPQ Carbonate as the alkali systems. The present invention was then prepared maximizing the potassium hydroxide concentration and carbonating the material to achieve a higher than equilibrium potassium carbonate yield while maintaining solubility. Dyeings were made and compared to the sodium carbonate and NPQ Salt. The results are shown below in Examples 6–27 in comparison with the other dye trials.

EXAMPLES 6–27

Conventional reaction dyeings of cotton fabrics were made to determine the dye yield of the candidate materials. The dyes selected were Procion™ Red HE7B, Reactive Red 141, and Procion™ Red HE3B, Reactive Red 120. These dyes are Monochlortriazine dyes and are available from ICI America of Wilmington, Del. These dyes were chosen because the HE3B is extremely sensitive to high active alkalinity; it dyes weak when too much alkalinity is used because of hydrolysis. The HE7B was used because it dyes weak unless a high enough active alkalinity is used because of low fixation of dye to fiber at lower active alkali values. Thus, these dyes represent the extremes likely to be encountered.

TABLE 2

HE7B Dye Trial Results

| Example | Alkali | Conc. | Suitable | Weak or Strong |
|---|---|---|---|---|
| 6 | S. Carbonate | 20% | Y | Standard |
| 7 | NPQ Salt | 5% | Y | Standard |
| 8 | NPQ Salt | 10% | Y | Standard |
| 9 | NPQ Salt | 15% | Y | Standard |
| 10 | NPQ Salt | 20% | Y | Standard |
| 11 | NPQ Carb | 10% | N | Weak |
| 12 | NPQ Carb | 20% | Y | Standard |
| 13 | Invention | 5% | N | Weak |
| 14 | Invention | 10% | Y | Standard |
| 15 | Invention | 15% | Y | Standard |
| 16 | Invention | 20% | Y | Standard |

TABLE 3

HE3B Dye Trial Results

| Example | Alkali | Conc. | Suitable | Weak or Strong |
|---|---|---|---|---|
| 17 | S. Carbonate | 20% | Y | Standard |
| 18 | NPQ Salt | 5% | N | Weak |
| 19 | NPQ Salt | 10% | N | Weak |
| 20 | NPQ Salt | 15% | N | Weak |
| 21 | NPQ Salt | 20% | N | Weak |
| 22 | NPQ Carb | 10% | N | Weak |
| 23 | NPQ Carb | 20% | Y | Standard |
| 24 | Invention | 5% | N | Weak |
| 25 | Invention | 10% | Y | Standard |
| 26 | Invention | 15% | Y | Standard |
| 27 | Invention | 20% | Y | Standard |

These results clearly show that the present invention will yield on the alkali sensitive HE3B at both equal concentrations to sodium carbonate and at lower concentrations to sodium carbonate since at less than 20%, sodium carbonate does not have enough alkalinity to cause the dye to react with the fiber. The above examples also show that the present invention is an acceptable substitute for phosphorus-based alkali for reactive dyeing of cotton and cotton blended fabrics or the like.

The amount of carbonate in the present invention can be varied between a low of about 22 to a high of about 45 wt % with 40 wt % being most preferred. The amount of alkali metal hydroxide in the present invention varies between a low of about 4 to a high of about 12 wt % with 7 wt % being most preferred. Accordingly, the preferred composition has the following properties:

Appearance: Clear liquid
Active Alk: 10.2–11.2
Total Alk: 20.5–22.0
2% pH: 12.2–12.4
Potassium Carbonate: 39.00–41.67 wt %
Potassium Hydroxide: 4.38–9.19 wt %
Potassium Citrate: 4 wt %
Potassium Polyacrylate 100000 mwt: 3.8 wt %

This provides a liquid alkali product that can be used at 10% on weight of fabric (OWF) in dyeing machines with liquor ratios from 1:1 up to 100:1. At higher liquor ratios, a higher OWF may be necessary for acceptable yield.

EXAMPLES 28–30

A buffered alkali composition, referred to herein as SA-200, was prepared by reacting potassium hydroxide with $CO_2$ while mixing until a 2% pH solution was about 12. The SA-200 had an active alkalinity of 10.7 and a total alkalinity of 21.7. The SA-200 was then mixed with sodium hydroxide in the form of liquid caustic in different amounts until and the active and total alkalinities of the resultant mixtures were comparable to the alkalinities of Burco® NPQ salt and two commercially available alkalis used in the dyeing of textiles with vinyl sulfone dyes.

The following compositions were prepared. All amounts are in parts by weight:

TABLE 4

SA-200 and Liquid Caustic

| Example | SA-200 | Liquid Caustic | Suitable | Weak or Strong |
|---------|--------|----------------|----------|----------------|
| 28 | 19 | 29 | Y | Standard |
| 29 | 40 | 24 | Y | Standard |
| 30 | 10 | 26 | Y | Standard |

The carbonate content and the active and total alkalinities of these compositions were then compared to the commercially available products.

TABLE 5

Comparative Test Results

| | Carbonate | Active | Total |
|---|---|---|---|
| Burco ® NPQ Salt | 6.2 | 13.6 | 18 |
| Example 28 | 5.3 | 13.64 | 15.5 |
| Alkali A | 13.4 | 14.4 | 22.2 |
| Example 29 | 12.2 | 14.28 | 18.39 |
| Alkali B | 0.0 | 11.8 | 12.3 |
| Example 30 | 2.1 | 11.25 | 12.16 |

As can be seen, most possible combinations of active, total and carbonate alkalinity can be made by mixing liquid caustic soda and SA-200.

Certain modifications and improvements will occur to those skilled in the art upon reading of the foregoing description. By way of example, amino, polyphosphate, gluconate, and polymeric chelating agents are possible substitutes for polyacrylic acid. Also, other additives may include phosphoric acid derivatives and alkaline stable surfactants. It should be understood that all such modifications and improvements have been deleted herein for the sake of conciseness and readability but are properly within the scope of the following claims.

I claim:

1. A clear stable, supersaturated, phosphorous-free and silicate-free, aqueous solution for reactive dyeing of cotton and cotton blended fabrics, said solution comprising:

(a) about 1 to about 50 wt % of sodium hydroxide;

(b) potassium hydroxide in an amount of about 4 to about 10 wt %; and (c) about 1 to about 50 wt % of potassium carbonate, wherein said solution has a pH of at least 10, an active alkalinity of between about 5 to about 38, and a total alkalinity of between about 10 to about 38.

2. The solution according to claim 1, further including up to about 5 wt % of an alkali metal citrate.

3. The solution according to claim 1, further including up to about 10 wt % of an alkali metal polyacrylate.

4. A clear, stable, supersaturated, phosphorous-free and silicate-free aqueous solution for reactive dyeing of cotton and cotton blended fabrics, said solution comprising:

(a) about 1 to about 50 wt % of sodium hydroxide;

(b) potassium hydroxide in an amount of about 4 to about 10 wt %;

(c) about 1 to about 50 wt % of potassium carbonate;

(d) up to about 5 wt % of an alkali metal citrate;

(e) up to about 10 wt % of an alkali metal polycrylate; and (f) the balance water, wherein said solution has a pH of at least 10, an active alkalinity of between about 5 to about 38, and a total alkalinity of between about 10 to about 38.

* * * * *